United States Patent
Raeis Hosseiny et al.

(10) Patent No.: US 11,772,557 B2
(45) Date of Patent: Oct. 3, 2023

(54) GUIDED COACHING FOR VEHICLE POSITIONING TO OPERATE AN AUTOMATED HITCHING FEATURE

(71) Applicant: Ford Global Technologies, LLC, Dearborn, MI (US)

(72) Inventors: Seyed Armin Raeis Hosseiny, Canton, MI (US); Bo Bao, Bloomfield, MI (US); Luke Niewiadomski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 856 days.

(21) Appl. No.: 16/674,589

(22) Filed: Nov. 5, 2019

(65) Prior Publication Data
US 2021/0129752 A1 May 6, 2021

(51) Int. Cl.
*B62D 13/06* (2006.01)
*B60R 1/00* (2022.01)
*B60D 1/36* (2006.01)
*G05D 1/00* (2006.01)
*B60W 10/20* (2006.01)
*G05D 1/02* (2020.01)

(52) U.S. Cl.
CPC ............... *B60R 1/003* (2013.01); *B60D 1/36* (2013.01); *B60W 10/20* (2013.01); *B62D 13/06* (2013.01); *G05D 1/0033* (2013.01); *G05D 1/0238* (2013.01); *B60W 2420/42* (2013.01); *B60W 2520/22* (2013.01); *B60W 2720/22* (2013.01)

(58) Field of Classification Search
None
See application file for complete search history.

(56) References Cited

U.S. PATENT DOCUMENTS

| 9,403,413 B2 | 8/2016 | Talty et al. | |
|---|---|---|---|
| 2009/0236825 A1* | 9/2009 | Okuda | B60D 1/36 348/148 |
| 2011/0001614 A1* | 1/2011 | Ghneim | B60K 35/00 382/103 |
| 2018/0029429 A1* | 2/2018 | Janardhana | B60D 1/62 |
| 2018/0147900 A1* | 5/2018 | Shank | G06V 10/245 |
| 2020/0097021 A1* | 3/2020 | Carpenter | G05D 1/0225 |
| 2020/0198533 A1* | 6/2020 | Gedrimas | B60Q 1/44 |
| 2021/0339588 A1* | 11/2021 | Takahama | B60D 1/62 |

FOREIGN PATENT DOCUMENTS

| CN | 1991311 A | 7/2007 |
|---|---|---|
| EP | 2988973 B1 | 7/2018 |

* cited by examiner

*Primary Examiner* — James M McPherson
(74) *Attorney, Agent, or Firm* — Frank Lollo; Price Heneveld LLP

(57) ABSTRACT

A system for assisting in aligning a vehicle for hitching with a trailer includes an imager outputting image data of a field of view to the rear of the vehicle and a controller identifying at least one of a trailer or a coupler of the trailer within the image data. The controller further determines that the at least one of the trailer or the coupler is outside of a specified area relative to the vehicle and outputs an instruction for movement of the vehicle determined to position the one of the trailer or the coupler within the specified area. Upon determining that the at least one of the coupler and the trailer is within the specified area, the coupler outputs a steering signal to the vehicle to cause the vehicle to steer to align a hitch ball of the vehicle with the coupler.

13 Claims, 14 Drawing Sheets

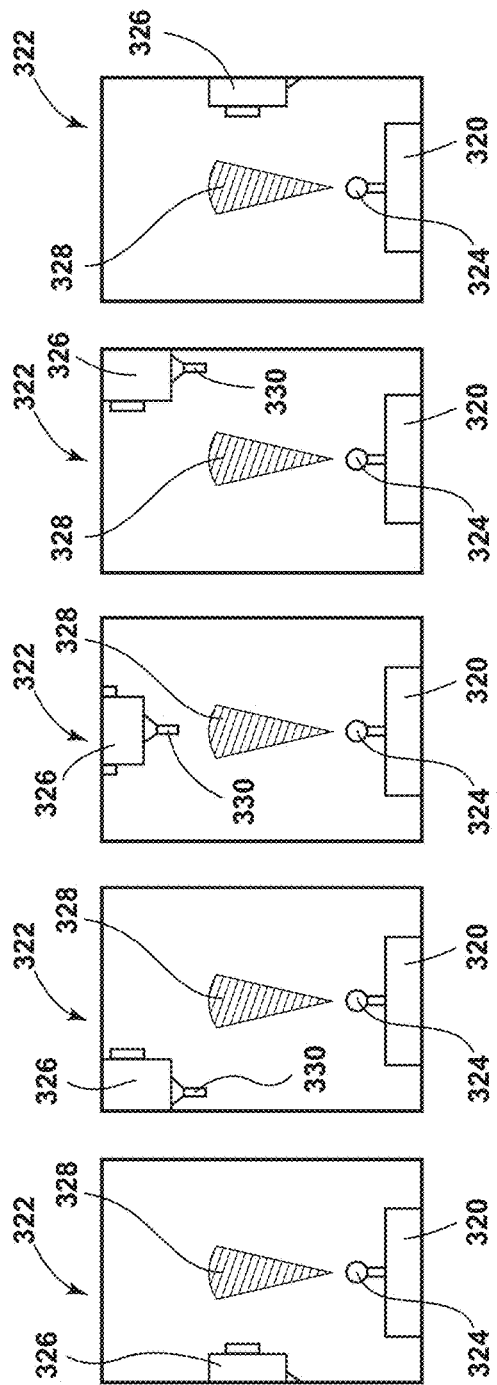
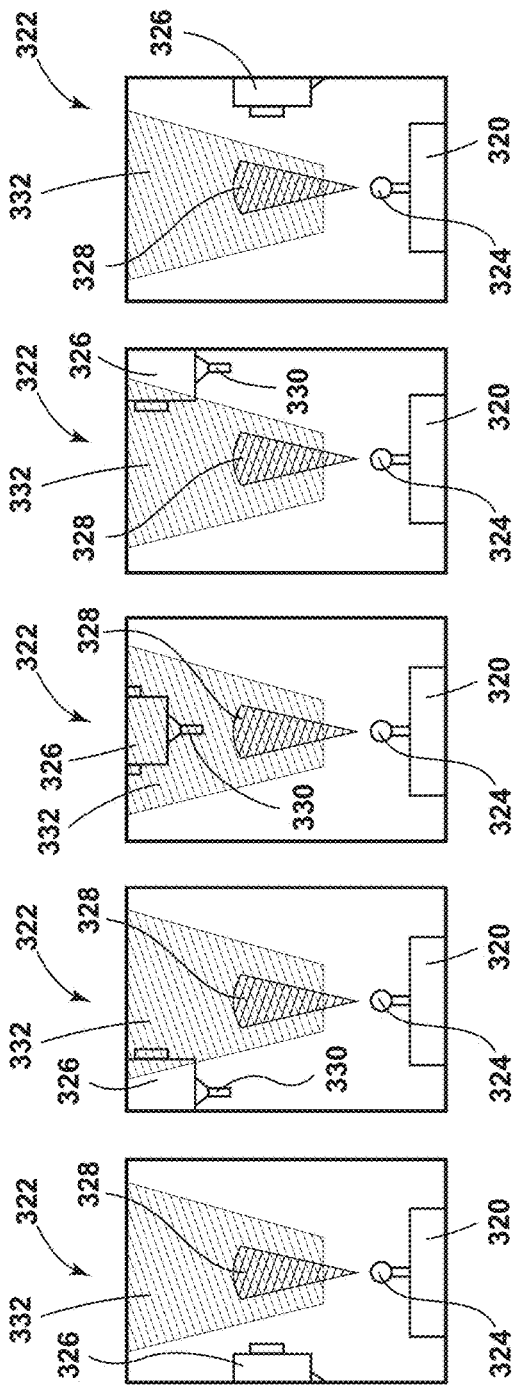

GUIDED COACHING FOR VEHICLE POSITIONING TO OPERATE AN AUTOMATED HITCHING FEATURE

FIELD OF THE INVENTION

The present invention generally relates to a vehicle hitch assistance system. In particular, the system provides instructions for movement of the vehicle to align a trailer within a specified area for operation of the hitch assistance system.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes an imager outputting image data of a field of view to the rear of the vehicle and a controller identifying at least one of a trailer or a coupler of the trailer within the image data. The controller further determines that the at least one of the trailer or the coupler is outside of a specified area relative to the vehicle and outputs an instruction for movement of the vehicle determined to position the one of the trailer or the coupler within the specified area. Upon determining that the at least one of the coupler and the trailer is within the specified area, the coupler outputs a steering signal to the vehicle to cause the vehicle to steer to align a hitch ball of the vehicle with the coupler.

Embodiments of the first aspect of the invention can include any one or a combination of the following features:
the specified area is defined between a maximum distance and a minimum distance from the rear of the vehicle and within left and right lateral vehicle control limits;
the instruction for movement of the vehicle includes a vehicle driving direction;
the instruction for movement of the vehicle includes a vehicle steering direction;
the controller further outputs a video image displayable on a human-machine interface within the vehicle including an image to the rear of the vehicle derived from the image data and a graphic overlay of the at least one instruction for movement of the vehicle;
the graphic overlay of the at least one instruction for movement of the vehicle includes a driving direction indicating element and a steering direction indicating element;
the video image further includes a schematic representation of a position of the trailer and coupler relative to the specified area;
the controller further determines that no trailer or coupler can be identified in the image data and outputs the video image further including an indication that no trailer is identified to the rear of the vehicle; and
the controller further identifies at least one of a plurality of trailers or a plurality of couplers within the image data and prompts a driver for a selection of one of the plurality of trailers or plurality of couplers as one of a targeted trailer or a targeted coupler, determines that the at least one of the targeted trailer or the targeted coupler is outside of a specified area relative to the vehicle and outputting an instruction for movement of the vehicle determined to position the one of the targeted trailer or the targeted coupler within the specified area, and determines that the at least one of the coupler and the trailer is within the specified area and outputs a steering signal to the vehicle to cause the vehicle to steer to align a hitch ball of the vehicle with the selected coupler.

According to another aspect of the present disclosure, a system for assisting in aligning a vehicle for hitching with a trailer includes an imager outputting image data of a field of view to the rear of the vehicle and controller identifying a trailer and a coupler of the trailer within the image data. The controller further determines a position of the trailer, including the coupler, with respect to a specified area relative to the vehicle and outputs an indication of the position the trailer and the coupler with respect to the specified area. Upon determining that the at least one of the coupler and the trailer is within the specified area, the controller outputs a steering signal to the vehicle to cause the vehicle to steer to align a hitch ball of the vehicle with the coupler.

According to another aspect of the present disclosure, a method for assisting in a hitching operation of a vehicle with a trailer includes identifying at least one of a trailer or a coupler of the trailer within image data to a rear of the vehicle received from an imager, determining that the at least one of the trailer or the coupler is outside of a specified area relative to the vehicle, and outputting an instruction for movement of the vehicle determined to position the one of the trailer or the coupler within the specified area. Upon determining that the at least one of the coupler and the trailer is within the specified area, a steering signal is output to the vehicle to cause the vehicle to steer to align a hitch ball of the vehicle with the coupler.

These and other aspects, objects, and features of the present disclosure will be understood and appreciated by those skilled in the art upon studying the following specification, claims, and appended drawings.

BRIEF DESCRIPTION OF THE DRAWINGS

In the drawings.

FIGS. 11A-11E are images depicting instructions, according to yet a further scheme, for moving a vehicle to position a trailer within an acceptable trailer target zone;

FIGS. 12A-12E are images depicting instructions, according to the scheme of FIGS. 11A-11E, for moving a vehicle to position a trailer within an acceptable trailer target zone at an acceptable heading angle relative to the vehicle;

DETAILED DESCRIPTION OF THE PREFERRED EMBODIMENTS

Figure 1:
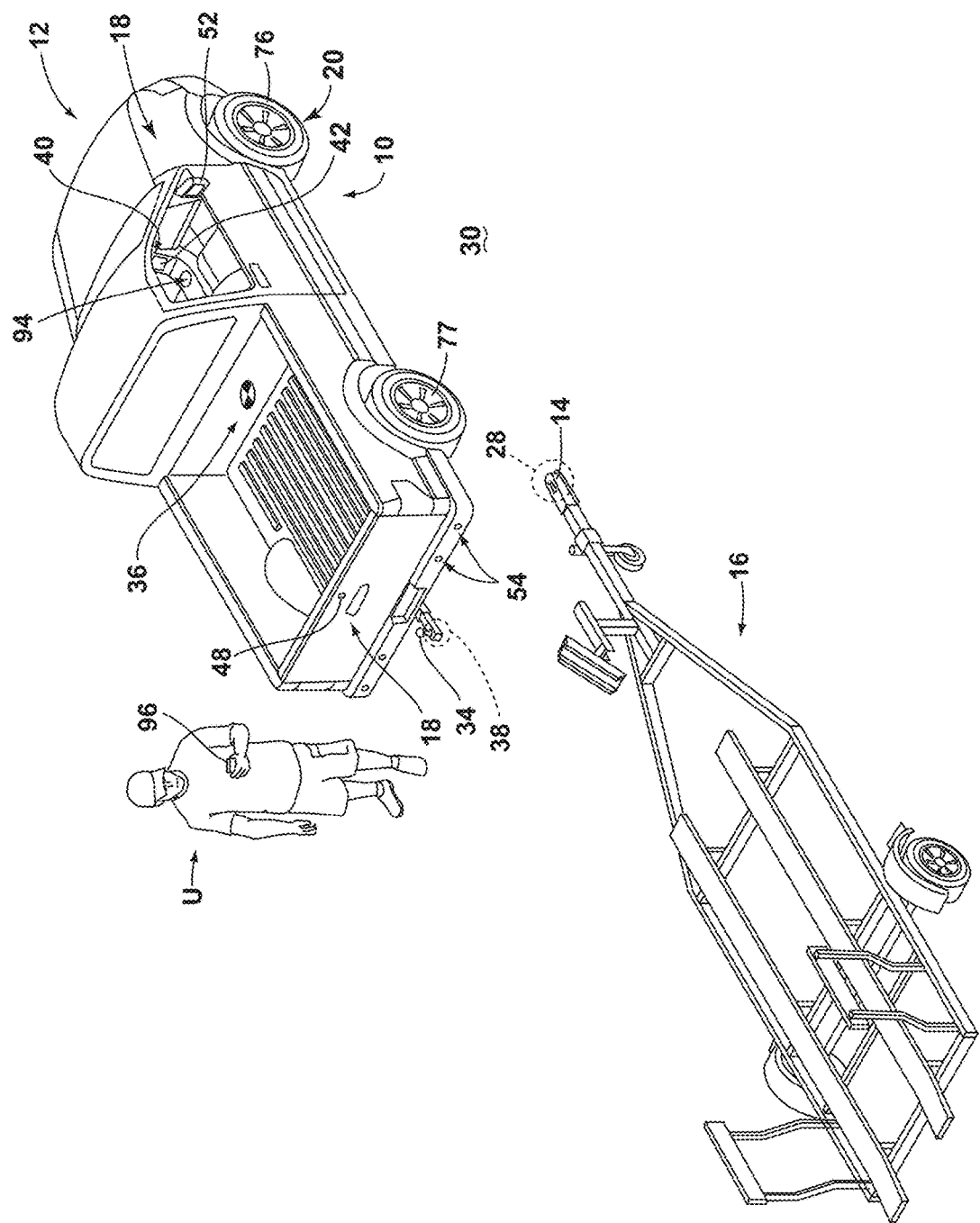
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes an imager (in the form of camera system 18 in the example of FIGS. 1-6) outputting image data 55 of a field of view 49 to the rear of the vehicle 12 and a controller 26 identifying at least one of a trailer 16 or a coupler 14 of the trailer 16 within the image data 55. The controller 26 further determines that the at least one of the trailer 16 or the coupler 14 is outside of a specified area 110 relative to the vehicle 12 and outputs an instruction 112 for movement of the vehicle 12 determined to position the one of the trailer 16 or the coupler 14 within the specified area 110. Upon determining that the at least one of the coupler 14 and the trailer 16 is within the specified area 110, the controller 26 outputs a steering signal to the vehicle 12 to cause the vehicle 12 to steer to align a hitch ball 34 of the vehicle 12 with the coupler 14.

Figure 2:
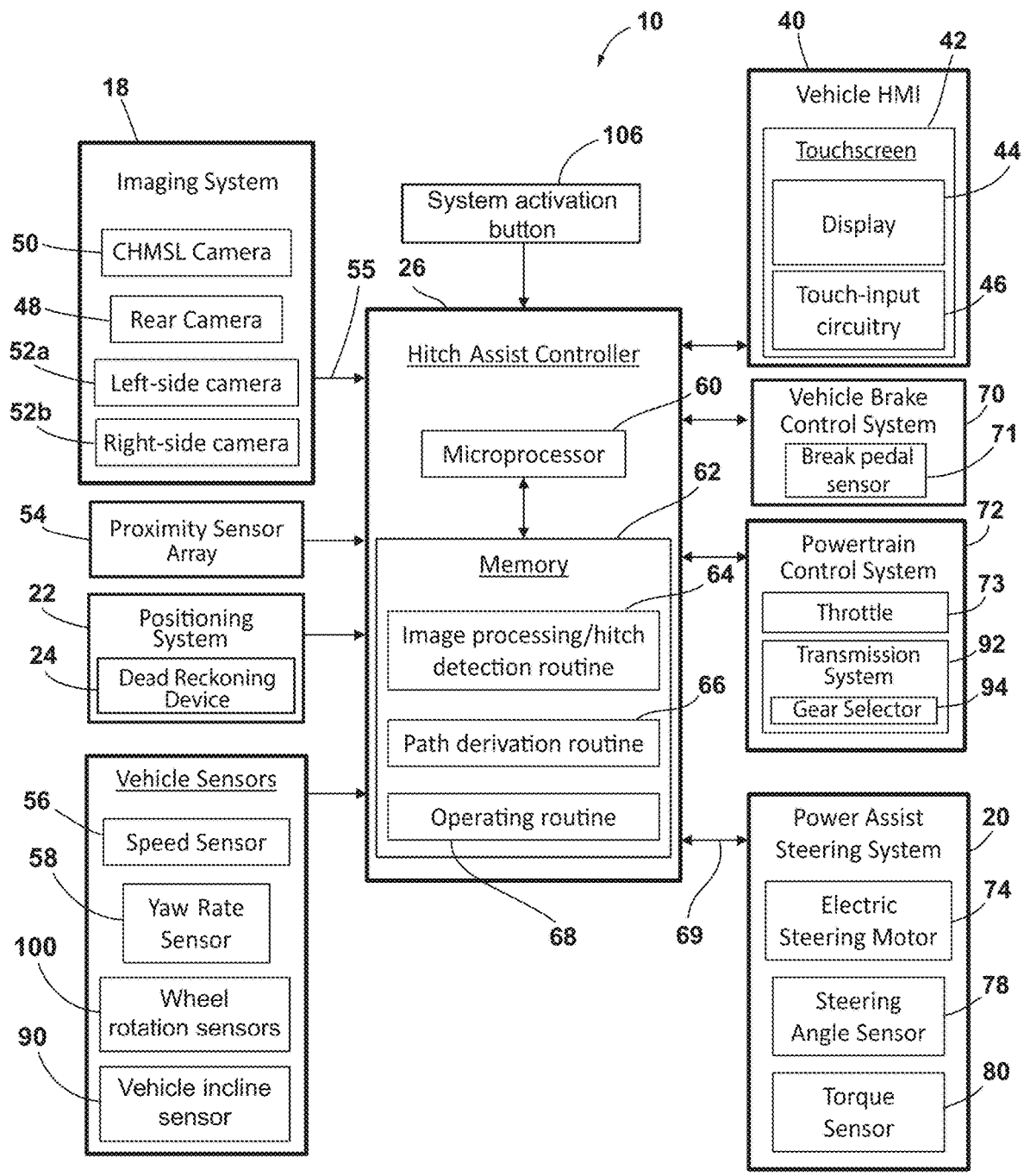
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering signal 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
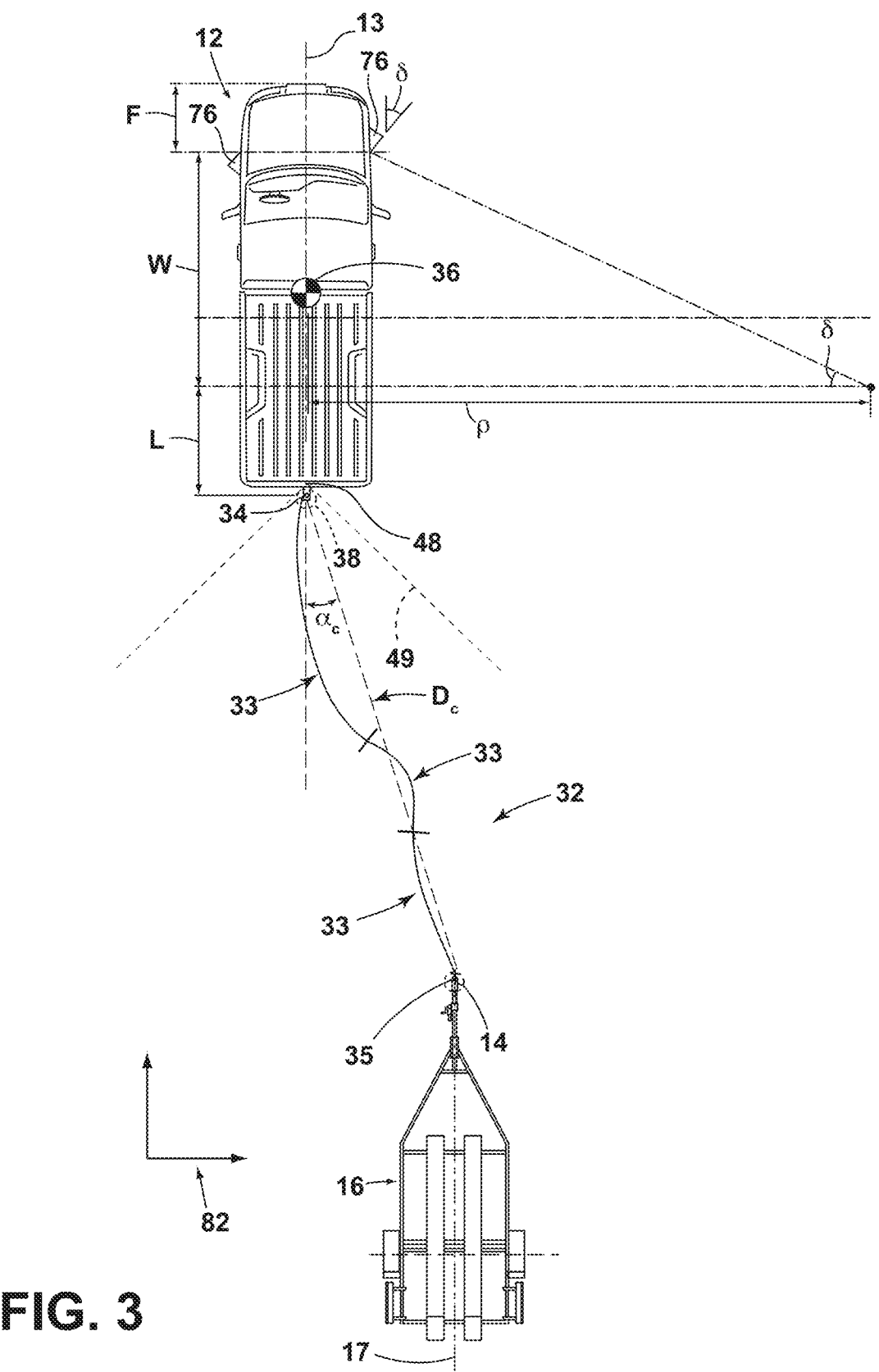
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an onboard computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance D to coupler 14 and an angle ct, of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius prim, to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
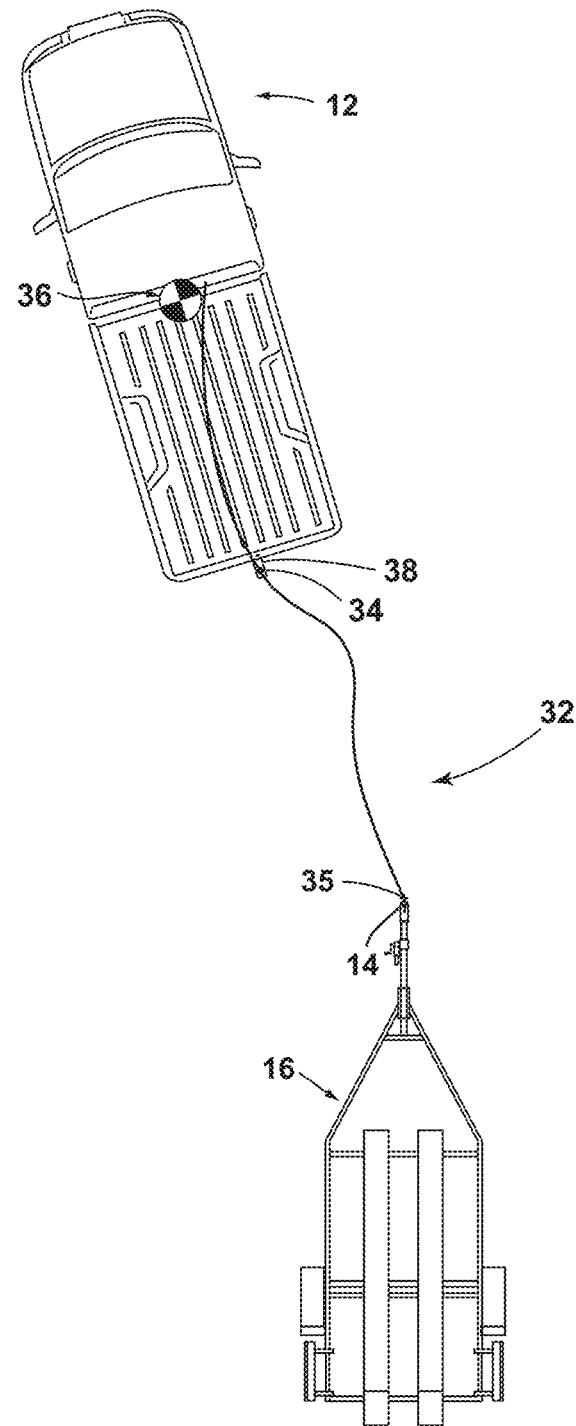
FIG. 4 is an overhead schematic view of the vehicle during a subsequent step of the alignment sequence with the trailer.
Figure 5:
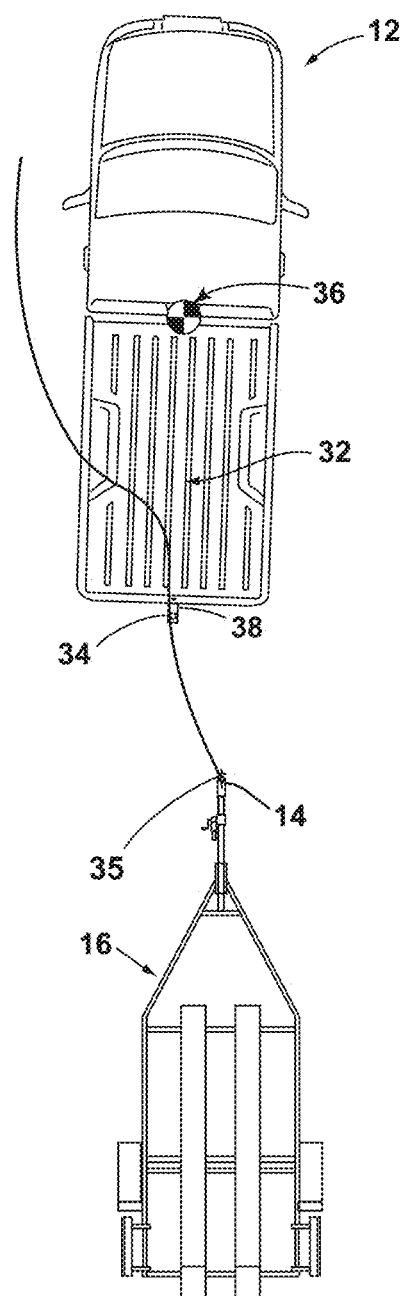
FIG. 5 is an overhead schematic view of the vehicle during a subsequent step of the alignment sequence with the trailer.
Figure 6:
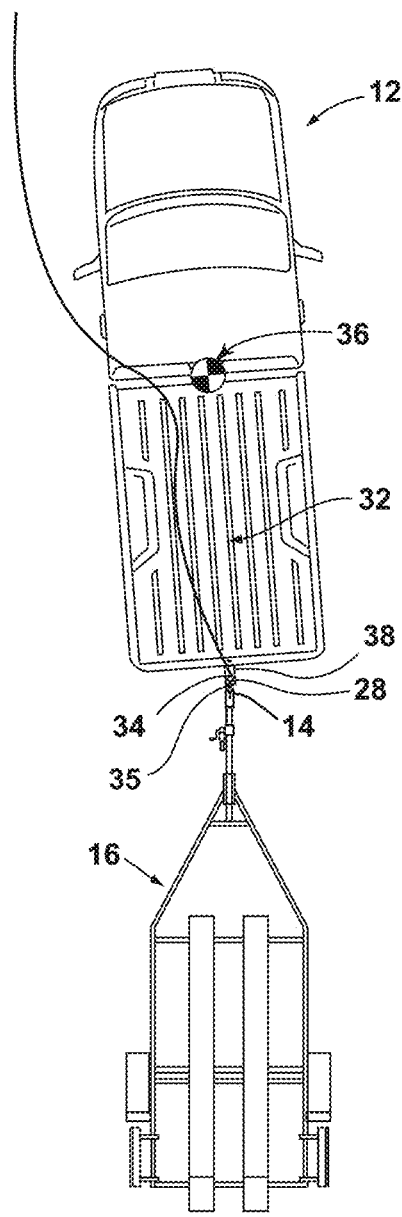
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38 thereof relative to the tracked position 28 of coupler 14, as discussed above and shown in FIG. 6.

Figure 7:
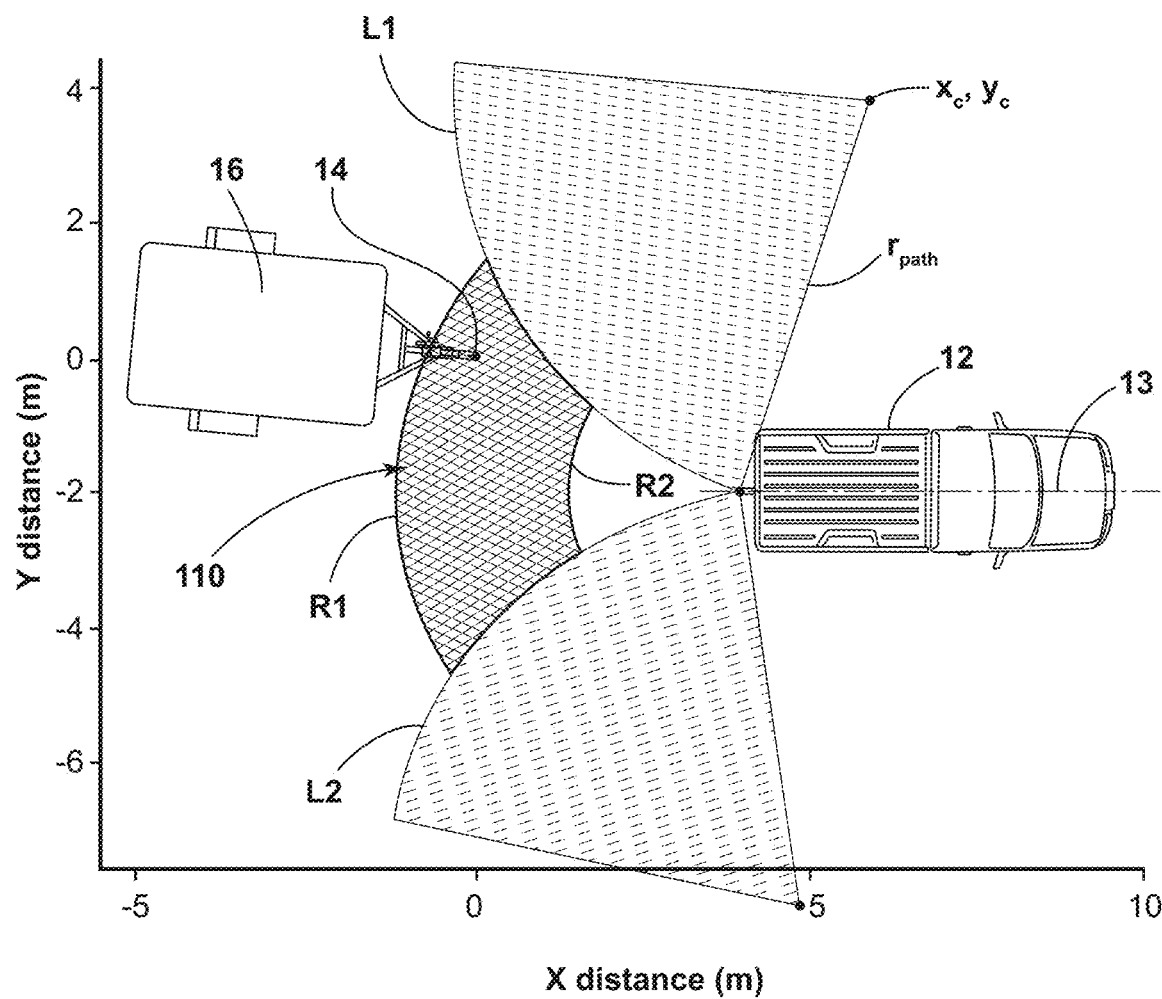
FIG. 7 is a schematic illustration of an acceptable trailer target zone relative to a vehicle including the present system.

As illustrated in FIG. 7, vehicle path 32 can be determined to achieve the needed lateral and rearward movement within the smallest area possible and/or with the lowest number of maneuvers. In the illustrated example of FIG. 7, path 32 can include three portions defined by steering of wheels 76 in different directions to collectively traverse the needed lateral movement of vehicle 12 during rearward backing segment to bring hitch ball 34 into the above-described offset alignment with coupler 14. It is noted that variations in the depicted path 32 may be used, including based on the initial detection accuracy or requirements and/or the initial position of steered wheels 76. It is further noted that the estimates for the positioning $D_c$, $α_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

In this manner, the initial determination of the position 28 of trailer 16 to an accepted level of accuracy is needed for execution of the path derivation routine 66 and subsequent automated backing of vehicle 12 along the path 32. Various characteristics or limitations of system 10 may impact the ability of system 10 to identify the trailer 16 (as well as the coupler 14, whenever such identification is carried out) in the data 55 received from imaging system 18 under certain conditions or in certain settings. Still further, various vehicle 12 or other system 10 characteristics may impact the ability of system 10 to navigate to reach a trailer 16 that is, nevertheless, present within the image data 55. Depending on the particular configuration of system 10, such characteristics can be partially driven by the imaging system 18 used by system 10. The imaging system 18 may be limited in its ability to identify a trailer 16 and/or coupler 14 within the entire field of the image data 55. In an example, it may be assumed, at least for simplicity of illustration, that system 10 only uses rear camera 48 for trailer 16 and coupler 14 detection, with rear camera 48 having a field of view 49 that is included in its entirety in the "total field" of the image data 55 (notably, if additional cameras 50,52*a*,52*b* are used, the total field of the image data 55 would include the entire assembled image from all such utilized cameras). The imaging system 18 limitations may limit system 10 functionality to only a limited distance between trailer coupler 14 and the vehicle 12, as different factors may limit the ability of controller 26 in identifying a trailer 16 or its coupler 14 when the trailer 16 and vehicle 12 are too close together or too far apart. For example, as illustrated in FIG. 7, the resolution of the various cameras 48,50,52*a*,52*b* in imaging system 18 may impact the ability to identify any trailers 16 or couplers 14 beyond a maximum distance R1 from vehicle 12 with the particular value of R1 being influenced by ambient conditions, including available light and/or weather conditions (e.g., rain or snow).

Additionally, a minimum distance R2, also illustrated in FIG. 7, for trailer 16 or coupler 14 detection may be realized because certain implementations of system 10 may rely on dynamic readings (such as of the ground surface behind vehicle 12 or other features visible around coupler 14) to calibrate system 10 and or to track vehicle 12 speed in reversing and to track the position of coupler 14 during system 10 operation. In particular, in the above example where only rear camera 48 is used by system 10, it may be necessary to detect motion within the field of view 49 to identify distance to the coupler 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R2 such that a proportionality of features, including of trailer 16 itself as well as of trailer 16 relative to the total field of image data 55, is optimized for image processing routine 64 functionality.

As also shown in FIG. 7, other limitations of system 10 functionality may add constraints to the target zone of operation. In this respect, system 10 may not be capable of maneuvering vehicle 12 towards all locations in an initial view of the rear camera 48 (i.e., during trailer 16 or coupler 14 identification). In particular, system 10 may be restricted in its ability to reach a potential target position due, but not limited, to a lateral span that is a function of a distance range and the steering angle δ limitations of vehicle 12. In one aspect, the maximum steering angle $δ_{max}$ of the vehicle 12 determines the lateral range, as a function of distance $D_c$ to coupler 14, as discussed further below. In general, an implementation of system 10 may restrict maneuvering of vehicle 12 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $δ_{max}$. As the vehicle 12 travels laterally by turning the steered wheels 76 and reversing, the left and right lateral vehicle control limits L1,L2 of system operability 10 are determined as, essentially, a theoretical hitch ball 34 path extending rearward of the vehicle corresponding with steering of vehicle 12 at a particular steering angle δ under reversing of vehicle 12 to either side. In this manner, the lateral vehicle control limits L1,L2 of system 10 may extend outwardly from vehicle 12, with increasing distance away from vehicle 12 and may be characterized or determined based on left and right steering path limits of vehicle 12.

In a further aspect, the lateral vehicle control limits L1,L2 may be limited by an operating angle $δ_{op}$ that is lower than maximum steering angle $δ_{max}$. The difference between the operating angle $δ_{op}$ and the maximum steering angle my vary based on criteria that can be selected to optimize or improve the performance of system 10, to address various constraints on the operation of system 10, or to increase the predictability or reliable performance of system 10. In one aspect, it may simply be desired for system 10 to be prevented from calling for a maximum steering angle $δ_{max}$ to allow system 10 to manage variations that may arise in the actual maximum angle $δ_{max}$ reachable by the steering system 20 under varying conditions, to prevent wear on steering system 20, or the like. In this manner, the lateral vehicle control limits L1,L2 of system 10 functionality may be further limited.

Because of these limitations, the present system 10 may be configured to only function with trailers 16 and associated couplers 14 positioned inside the specified area 110 relative to the vehicle 12, as shown in FIG. 7. The target area 110 may be determined by the factors listed above, and, potentially, any additional factors that affect the system 10 capability. To ensure such positioning of vehicle 12 relative to trailer 16, system 10 can be generally configured to direct the user to position vehicle 12 relative to trailer 16 such that trailer 16 (or coupler 14) is within such a target area 110 of the field of view of the utilized cameras, such as field of view 49 of rear camera 48, and the corresponding image data 55. As discussed above, the limitations of camera 48 and the requirements of image processing routine 64 and operating routine 68 can establish the maximum distance R1 and the minimum distance R2 from the rear of vehicle 12 for coupler 14 identification, which can establish the bounds of the specified area 110 with general respect to the longitudinal axis 13 of vehicle 12. In the illustrated example, the maximum distance R1 and the minimum distance R2 can be measured from the hitch ball 34 (or alternatively the rear camera 48, which may be positioned adjacent hitch ball 34, albeit at a different height) at a consistent distance therefrom such that R1 and R2 are radially spaced about the hitch ball 34 (or rear camera 48).

Figure 8:
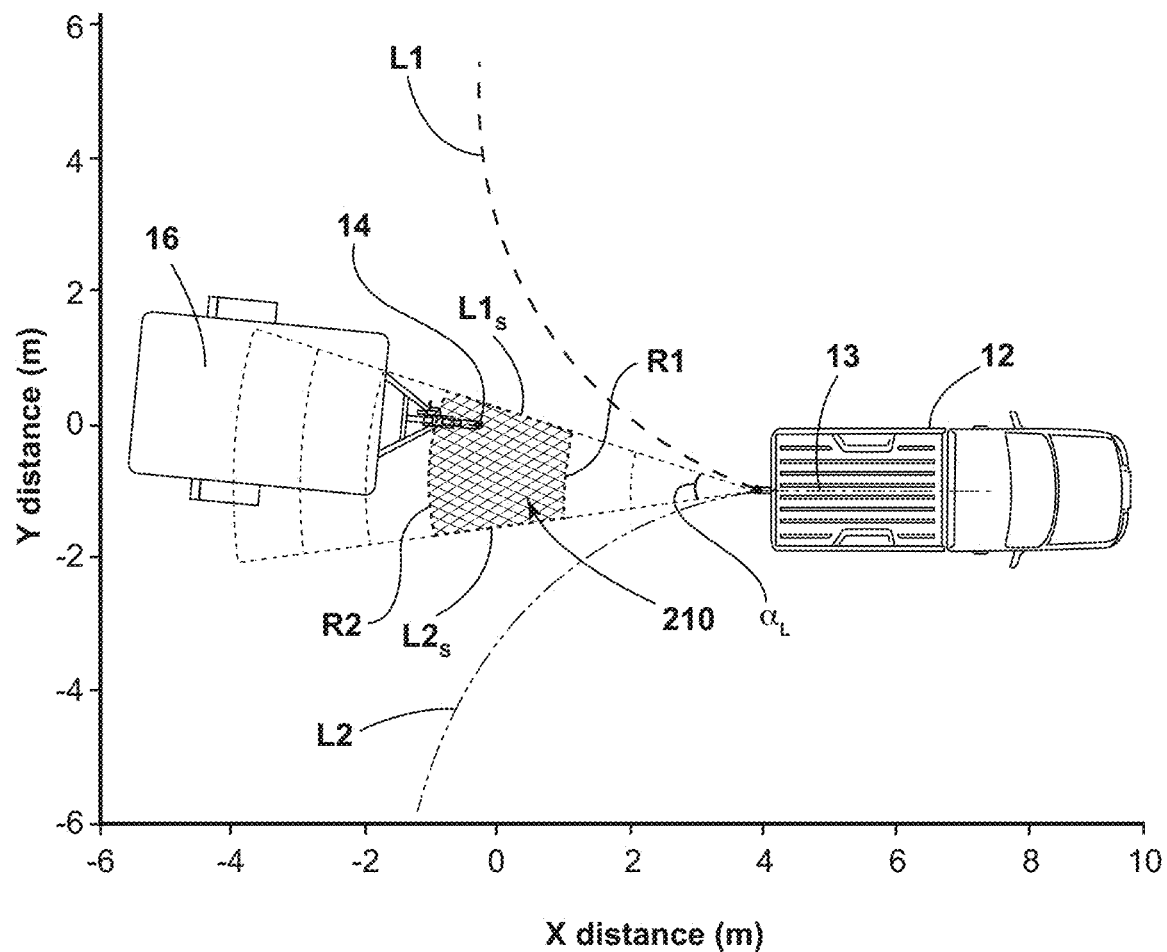
FIG. 8 is a schematic illustration of the acceptable trailer target zone with additional limits applied thereto.

As shown in FIGS. 7 and 8, the lateral limits L1,L2 can extend rearward from hitch ball 34 along arced paths based on the steering characteristics of vehicle 12, including the steering limit $\delta_{max}$ of steering system 20 and other limitations or performance parameters. In particular, the performance of system 10 in controlling vehicle 12 and/or providing a generally-acceptable path 32 may be improved, as discussed above, by configuring path derivation routine 66 to maintain the steering angle $\delta$ below the maximum $\delta_{max}$ by a predetermined amount or at the otherwise established operating angle $\delta_{op}$. In one example, the operating angle $\delta_{op}$ may be less than the maximum steering angle $\delta_{max}$ by a preset or adjustable offset, which may be a set angle (e.g., about 3° to about 10°) or by a preset or adjustable percentage based proportion (e.g., about 5% to about 25%). In other examples, discussed above, the operating angle $\delta_{op}$ may be based on specific characteristics of vehicle 12 based on other set or adjustable parameters. As shown in FIG. 8, the projected lateral limits L1,L2 can each be a single arc-shaped segment extending from the hitch ball 34 in a direction toward the coupler 14. From the determined operating angle $\delta_{op}$, system 10 can determine the lateral limits L1,L2 within a frame of reference centered at hitch ball 34 and its x-axis aligned with the longitudinal axis 13 of vehicle 12. Notably, the length L, as well as the wheelbase W, which affect the positioning of the turn center for the determined steering angle are configurable based on the various vehicle parameters and can be stored in memory 62 and the upper limit of angle α can also be adjusted based on the parameters that influence R1, for example, such that the lateral limits L1,L2 are determined for an appropriate distance to intersect or cross the longitudinal limit R1. As shown in FIG. 7, a specified area for coupler 14 positioning, referred to as the "target zone" 110 can, thusly, be defined as the area bounded by the limits R1, R2, L1, and L2. In the example of FIG. 8, the target area 110 can be further restricted within the detectable and reachable areas discussed above, including within an area that can be reached along a path 32 from hitch ball 34 that is defined by a straight line. Accordingly, the target area 110 that is the subject of the coaching routine discussed herein may not directly correspond with the complete area within which detection of and navigation to coupler 14 is possible, but may rather be an area that can be reached within a restricted variation of operating routine 68. Further details on the determination for L1 and L2 are disclosed in co-pending, commonly-assigned U.S. patent application Ser. No. 16/208,777.

As shown in FIGS. 9A-10C, system 10 can provide instructions to "coach" or otherwise direct the driver of vehicle 12 in moving vehicle 12 to position at least one of coupler 14 or trailer 16 within the specified target area 110. In one aspect, these instructions can be presented in connection with a graphical overlay of a representation of target area 110 on a real-time video image of the image data 55 from one or more of the cameras 48,50,52a,52b in imaging system 18 presented on screen 44, as discussed further in the above-referenced '777 application. In another aspect, the instructions can substitute for any graphical overlay of targeted area 110, as the specific instructions may appear more clear to at least a selection of users. Such configurations may be selectable by a user. For purposes of the present example, various samples of instructions are discussed herein with reference to FIGS. 9A-10C, in which no graphical target area is shown. Additionally, the instructions described in the context of the present examples discuss the positioning of the trailer 16 or its coupler 14 with respect to the target area 110 with the understanding that, within a predetermined distance threshold, the coupler 14 will have to be identified, the trailer 16 only being acceptable for identification above a certain distance threshold, as discussed further above. It is understood that specific references to either the trailer 16 of coupler 14 are made in this context and do not reflect any specific example's requirement to identify such feature.

Figure 9A:
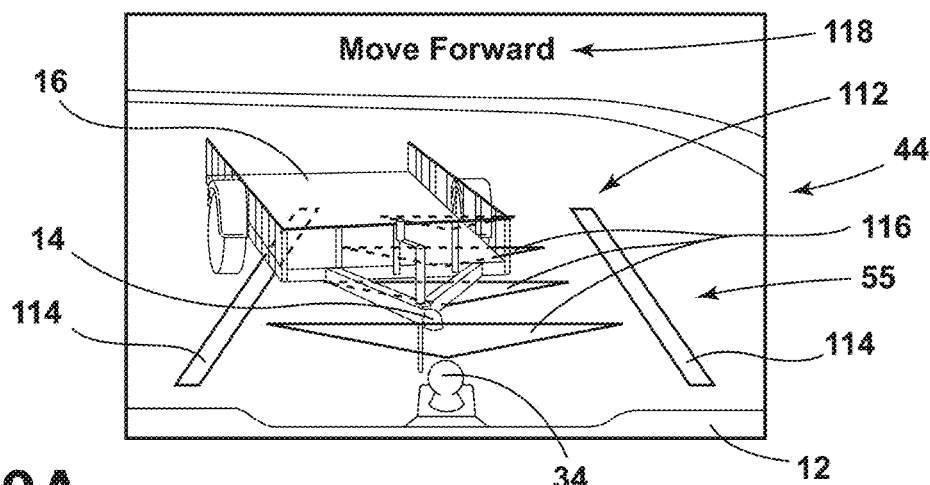
FIGS. 9A-9C are images depicting instructions for moving a vehicle to position a trailer within an acceptable trailer target zone.
Figure 9B:
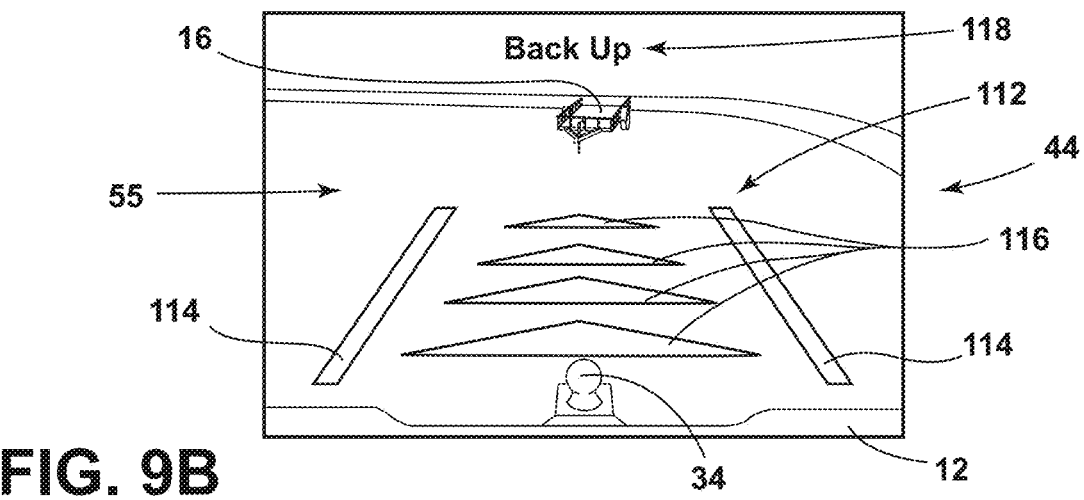
Figure 9C:
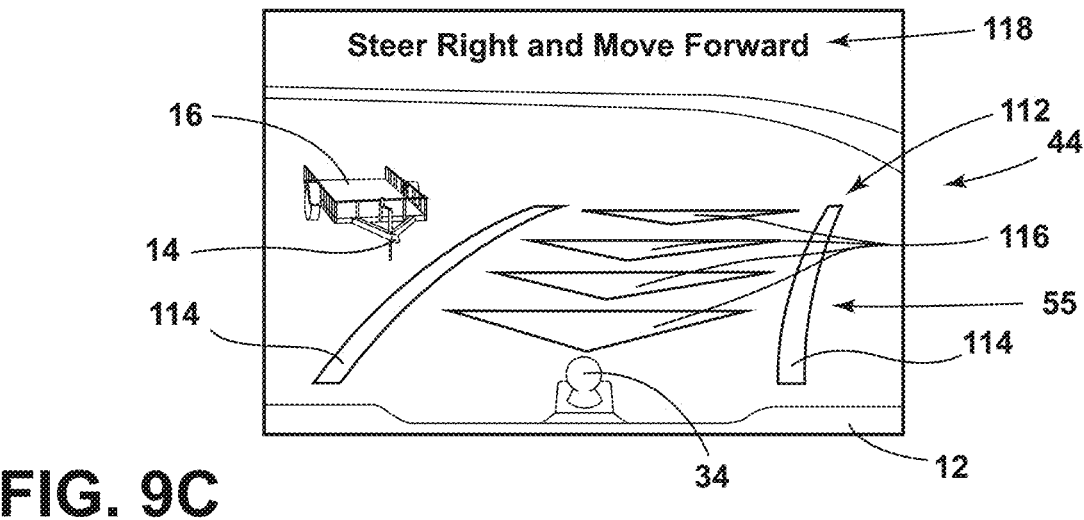

With specific reference to FIG. 9A, an example of a graphical instruction 112 is shown indicating that the vehicle 12 must be moved forward because the initial position of trailer 16 relative to vehicle 12 is such that the coupler 14 is too close to vehicle 12. In the illustrated example, the instruction 112 is presented as a graphical representation of the desired vehicle 12 path 114 with arrows 116 indicating the direction of travel (i.e. forward). Additionally, a verbal instruction 118 can be presented as a part of the instruction 112 such as the verbal instruction 118 to "move forward" shown in the present example. Such instruction 112 can remain present on screen 44 until the driver begins moving forward and, further, until such forward movement positions the coupler 14 at a distance $D_c$ beyond the threshold minimum distance R1. At such a point, the instruction 112 can change to an instruction to stop the vehicle 12 or can be removed in favor of a subsequent indication that the trailer 16 is properly positioned and that the operating routing 68 can be started. Additional examples of instructions 112 according to a similar scheme and with a similar appearance are shown in FIGS. 9B and 9C, wherein an instruction to move the vehicle forward (due to trailer 16 being too far from vehicle 12) is presented similarly to that of FIG. 9A with a straight vehicle path 114 and arrows 116 indicating a direction of rearward travel is shown in FIG. 9B. As illustrated, a verbal instruction 118 to "back up" can also be presented. In FIG. 9C, an instruction 112 is shown that can be presented when the trailer 16 or coupler 14 (as applicable) is too offset from the center axis 13 of vehicle 12. In such a scenario, the vehicle 12 cannot be moved directly to the side (left or right) needed to alleviate the offset condition but must also be driven either forward or backward, with the steered wheels 76 turned in the appropriate direction. Accordingly, the instruction 112 shown in FIG. 9C is presented with a path 114 corresponding with the steered wheels 76 turned in the necessary direction with the arrows 116 following the direction of path 114 corresponding with either forward or backward driving (in the present example, a rightward steering path 114 is shown with forward arrows 116). A corresponding verbal instruction 118 to "steer right and move forward" is also presented. The driving direction instruction 112 can be determined based on the detected distance between trailer 16 and vehicle 12 (e.g., with an instruction to back up with a distance over a predetermined threshold, such halfway through target area 110, and an instruction to move forward with a distance below the predetermined threshold). In another example, the instruction 112 including directional driving can default to an instruction to move forward to remove the possibility that the driver may reverse toward the trailer 16 with the steering angle too low to correct the offset condition in the available space between vehicle 12 and trailer 16. Further, it is anticipated that any required driving of vehicle 12, either forward or backward, to alleviate the offset condition may result in the trailer 16 being too close to, or too far from vehicle 12 such that an additional, subsequent instruction to back up or move forward (FIGS. 9A and 9B, respectively) may be required to finally position trailer 16 or coupler 14, as applicable, within the target area 110.

Figure 10A:
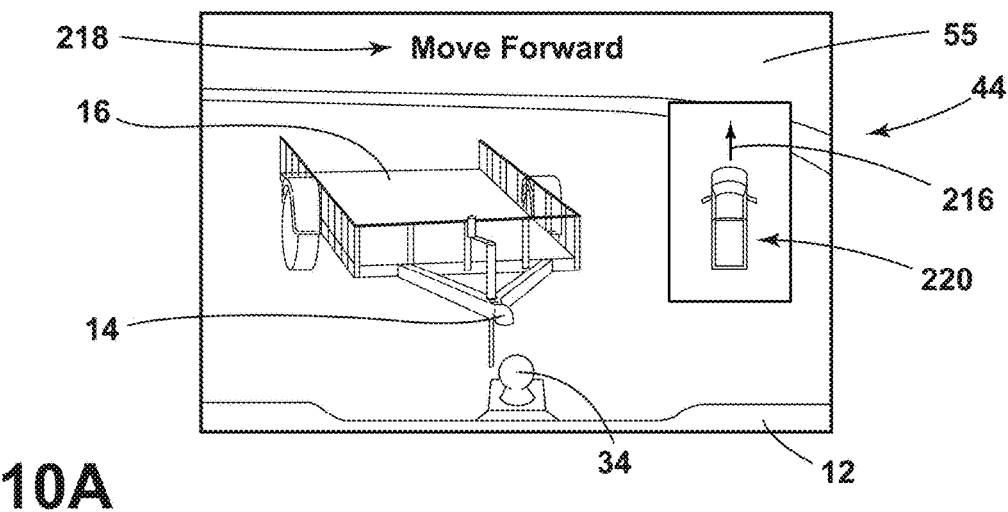
FIGS. 10A-10C are images depicting instructions, according to a further scheme, for moving a vehicle to position a trailer within an acceptable trailer target zone.
Figure 10B:
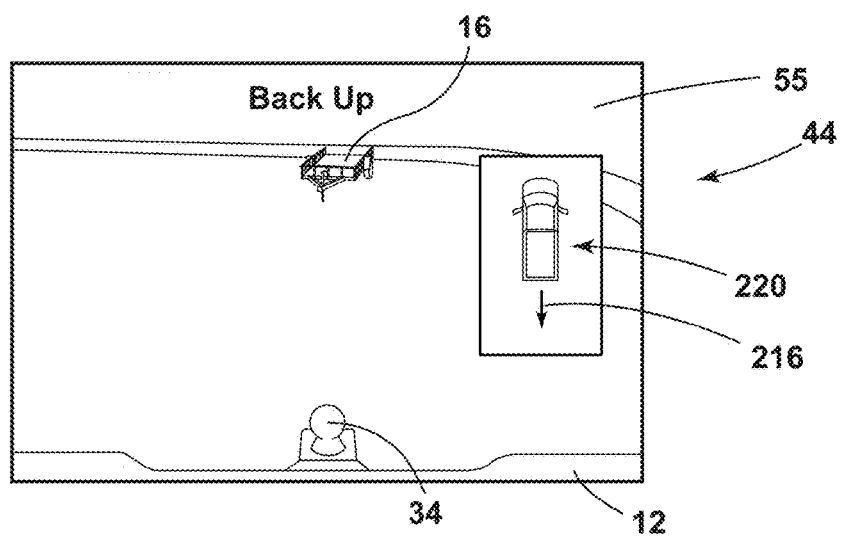
Figure 10C:
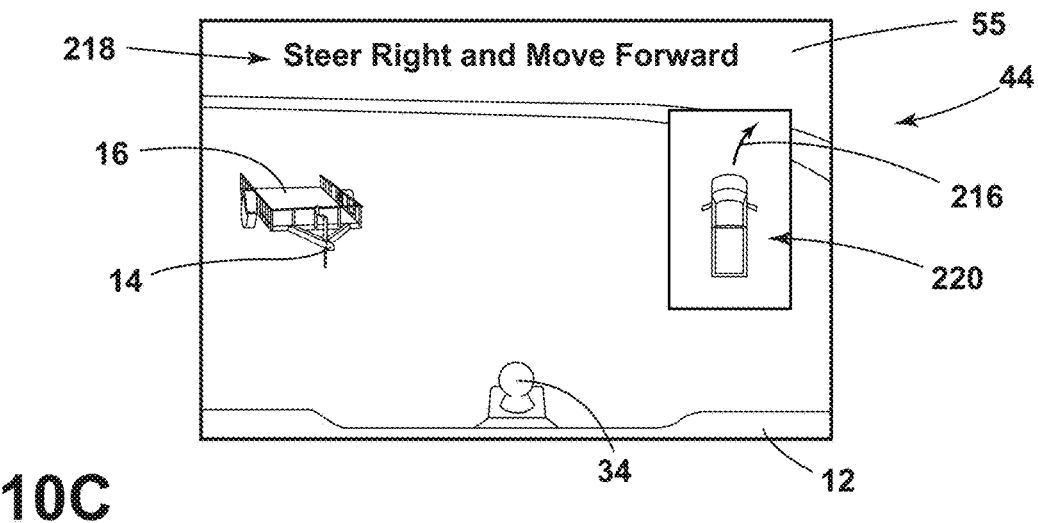

An alternative scheme for providing instructions 212 to the driver of vehicle 12 according to the principles outlined above is depicted in FIGS. 10A-10C. In the present example, the instructions 212 are presented in connection with a schematic representation 220 of vehicle 12 presented graphically on display 44 over the image data 55 received from camera system 18. In the illustrated example, the schematic representation 220 is an overhead view of the vehicle 12. In this manner, the instruction 212 can include a single arrow 216 indicating both the driving direction and any steering direction needed to bring the trailer 16 or coupler 14 to the desired position within target area 110. Specifically, as shown in FIG. 10A, a straight, forward arrow 216 can be presented as an instruction to move the vehicle 12 forward (when trailer 16 is initially too close to vehicle 12). Similarly, as shown in FIG. 10B, a straight, rearward arrow 216 can be presented as an instruction to move the vehicle 12 backward (when trailer 16 is initially too far from vehicle 12). In FIG. 10C, the instruction 212 is shown as a generally forward-facing arrow 116 that is curved to the right to indicate that vehicle 12 should be driven forward while steered to the right. Corresponding verbal instructions 218 are also illustrated in a similar manner to FIGS. 9A-9C, but may be omitted.

Turning now to FIGS. 11A-14B, an additional or alternative coaching scheme is described. In the present example, the coaching scheme includes outputting an indication of the position the trailer 16 and the coupler 14 with respect to the specified area 110. In particular, the indication of the position of the trailer 16 and the coupler 14 with respect to the specified area 110 can be output as a schematic representation 322 that includes an approximate position of the trailer 16 and coupler 14 relative to the specified area 110 as a graphic element within or overlaid on the video image data 55 shown on the screen 44 within HMI 40. In the example shown, controller 26 can (using data from image processing routine 62, for example) select an appropriate image from a number of preset images (e.g., the various representations 322 shown in FIGS. 11A-11E) to communicate the general or approximate positioning of trailer 16 and coupler 14 relative to vehicle 12. As shown in FIGS. 11A-11E, such a scheme may not necessarily involve communicating the exact relative positioning between trailer 16, including coupler 14, and vehicle 12, but may rather depict a simplified spatial relationship between the trailer 16, including the coupler 14, and the specified area 110. Such schematic representations 322 can correspond with a general distance relative to vehicle 12 (e.g. too far, acceptable, and too close) and general lateral position relative to a graphical depiction 328 of target area 110 (e.g. to the right, aligned, and to the left). In the illustrated examples in FIGS. 11A-11E, such positions can be combined to result in a selection of five different representations corresponding to preselected locations for communicating the approximate positioning of trailer 16 relative to vehicle 12. In an aspect, the particular representation 322 chosen may be based on a confidence assessment based on the location 28 of coupler 14 (or of trailer 16) determined by image processing routine 64 with the representation 322 most closely corresponding with the confidence assessment being selected. In another example, the area to the rear of vehicle 12 or within the field of view 49 of camera 48, for example, can be divided into segments with the indication 322 corresponding with the segment in which coupler 14 is present being selected for display.

As shown in FIG. 11A, a representation 322 may be given indicating that the trailer 16 is positioned relative to the vehicle 12 such that the coupler 14 is both laterally too far to the right (or passenger side) and longitudinally too close to vehicle 12. In particular, the representation 322 can include a vehicle representation 320, with a corresponding hitch ball representation 324, both of which can be static within the representation 320. A target area representation 328 can also be positioned in a static position relative to the vehicle and hitch ball representations 320,324. A trailer position indication image 326 that can include a coupler portion 330 and can be depicted in an area that is laterally to the corresponding side of the vehicle representation 320 (which is to the left on the screen 44 in the particular representation 322 shown) and in a position where the coupler representation 330 is generally aligned with the hitch ball representation 324. In various aspects, a verbal direction can also be given with the representation 320 (which may in the present example be to drive forward and turn right) and/or the representation 322 can be presented in connection with an additional instruction 112 similar to that which is shown in FIG. 9C. As further shown in FIG. 11B an additional representation 322 can indicate positioning of trailer 16 relative to vehicle 12 that is within a longitudinally acceptable range (i.e. between R1 and R2) but is laterally outside of the range (i.e. laterally beyond $L2_s$) by showing a generally corresponding relationship between the trailer position indication image 326 and the vehicle representation 320. Again, such a representation can be accompanied by a verbal instruction to either "turn right and back up" or to "turn left and drive forward", according to the preference for system behavior. FIG. 11C shows a representation 322 indicating that the trailer 16 is too far from the vehicle, again, by showing a generally corresponding relationship between the trailer position indication image 326 and the vehicle representation 320. In this respect it is noted that at least a portion of the trailer position indication image 326 is present within the position indication 322 regardless of how far the trailer 16 is from the vehicle 12, which is reflected in the other representations 322 and the conditions they generally represent. FIGS. 11D and 11E indicate positions of trailer 16 relative to vehicle 12 that are generally mirror images of the positions depicted in FIGS. 11A and 11B.

During driving of the vehicle 12 to correct the positioning indicated by the particular one of the representations 322 presented to the driver (i.e. by presenting the representation 322 on screen 44), system 10 may change or transition among the various representations in FIGS. 11A-11E, for example, as the actual positioning of vehicle 12 relative to trailer 16 changes or crosses a threshold between the corresponding representation 322. In one example, when vehicle 12 is moved forward while being steered to the right in response to the representation 322 in FIG. 11A to increase the longitudinal spacing between vehicle 12 and trailer 16 and to laterally align coupler 14 within the target area 110, the trailer 16 may reach a position relative to vehicle 12 where an appropriate longitudinal distance has been reached, but trailer 16 remains laterally outside the target area 110. In such a situation, the representation 322 can change from that of FIG. 11A to that of FIG. 11B to indicate to the driver that additional lateral repositioning is needed (e.g., that the steering angle δ must be increased and that further forward driving is needed). After such action is carried out, trailer 16 may be properly laterally aligned with vehicle 12 but may be longitudinally too far from vehicle 12 such that the representation 322 of FIG. 11A is appropriate. Other sequences or transitions may be appropriate in different situations and can be implemented by system 10, as needed.

In addition to the relationship of coupler 14 with respect to target area 110 by way of the corresponding indications 330 and 328 in FIGS. 11A-11E, system 10 can use the representations 322 of FIGS. 12A-12E to indicate a proper heading angle 33 of trailer 16 relative to vehicle 12 for hitching. As illustrated, a trailer heading target representation 332 can be added to the representation 322 overlapping, where applicable, with the target area representation 328. The trailer position target representation 332 can be sized to correspond with the target area representation 328 such that a trailer 16 with its coupler 14 within the acceptable zone 110 must be within a specified heading 33 angle range relative to vehicle 12 to be considered appropriately positioned for execution of an automated hitching procedure. In this manner, a trailer 16 that is at too great a heading 33 angle may be such that the body of the trailer 16 may interfere with backing of vehicle or may be such that, when trailer 16 is hitched with vehicle 12, subsequent driving of vehicle 12 may result in a swingout angle of trailer 16 that is outside of an acceptable range. Accordingly, image processing routine 64, in addition to identifying the trailer 16 and/or coupler in the image data 55 can determine the trailer heading, including by assessing the position of coupler 14 relative to an identified body of the trailer 16 (i.e., centered or to either side) as well as the amount of the side of trailer 16 that is exposed in the image data 55. In this respect, it may not be necessary to determine the exact heading 33 of trailer 16 relative to vehicle 12, but rather within various increments (e.g., 15° or 30°). In one example, image processing routine 64 may simply determine if the trailer 16 heading 33 is acceptable (for example, within about 30° of aligned with vehicle 12) or not. Accordingly, system 10 can present a number of different representation images 322, illustrated in FIGS. 12A-12E, showing similar positioning of the trailer position representation 326 relative to the vehicle representation image 320 as in FIGS. 11A-11E. In the representation images 322 of FIGS. 12A-12E, the trailer position representation image 326 can be shown as being aligned with the vehicle representation image 320 when trailer 16 is determined to be within a range of acceptable heading 33 angles with respect to vehicle 12, as discussed above. The presentation of the trailer position target representation 332 can be useful in these scenarios to coach the driver to maintain the appropriate orientation of the trailer 16 heading 33 relative to vehicle during other maneuvers to bring the coupler 14 into the target zone 110.

Figure 13A:
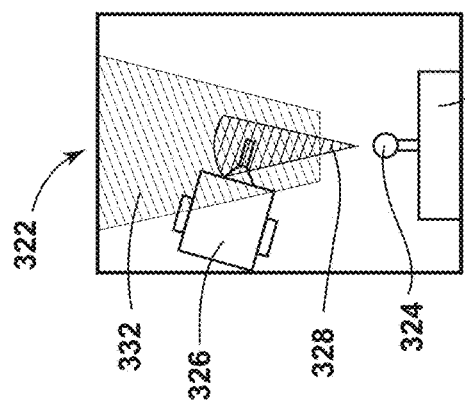
FIGS. 13A and 13B are images depicting instructions of the scheme of FIGS. 12A-12E, indicating that the trailer is within the acceptable trailer target zone but is not at an acceptable heading angle relative to the vehicle.
Figure 13B:
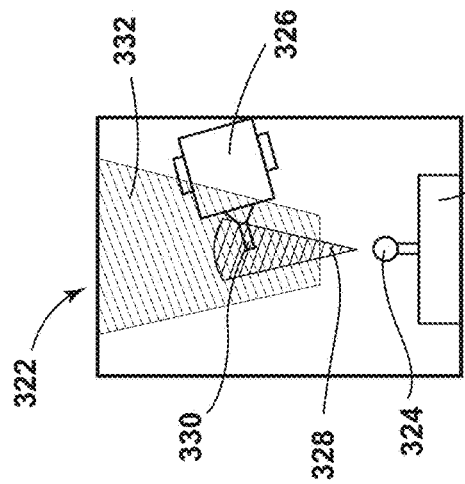
Figure 14A:
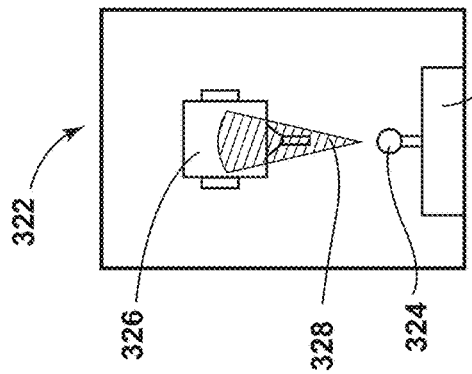
FIGS. 14A and 14B are images according to the schemes of FIGS. 11A-11E and 12A-12E, respectively, indicating that the trailer is properly positioned with respect to the trailer target area.
Figure 14B:
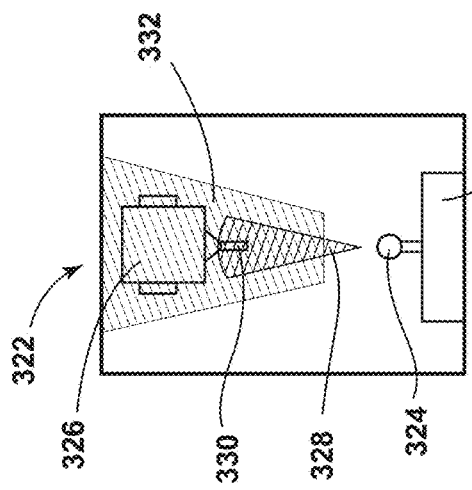

As shown in FIGS. 13A and 13B, if the position of trailer 16 is such that the coupler 14 is aligned with the target area 110 but the trailer heading 33 is at too great an angle with respect to vehicle 12, a corresponding representation 322 can be displayed in which the trailer position representation 326 is shown with the coupler portion 330 within the target area representation image 328 but angled sideways such that a portion of the image 326 extending out of the trailer heading target representation 332 to the appropriate side (passenger side in FIG. 13A or driver side in FIG. 13B). When the desired positioning of trailer 16 relative to the target area 110 and/or vehicle 12 is achieved, the representation 322 can indicate such positioning. As shown in FIG. 14A, when the trailer heading is not accounted for, the representation 322 can simply show the trailer position representation 326 the coupler portion 330 within the target area representation image 328. In one aspect, the target area representation image and/or trailer position representation 326 can change in appearance (color, transparency, size, etc.) to further indicate appropriate positioning. As shown in FIG. 14B, when trailer heading is accounted for, the representation 322 can show the trailer position representation 326 the coupler portion 330 within the target area representation image 328 and aligned behind the vehicle representation image 320 such that it is further within the trailer heading target representation 332. Similar to FIG. 14A, the target area representation image 328 and trailer heading target representation 332 can change in appearance separately to indicate fulfilment of the respective positional conditions.

Figure 15A:
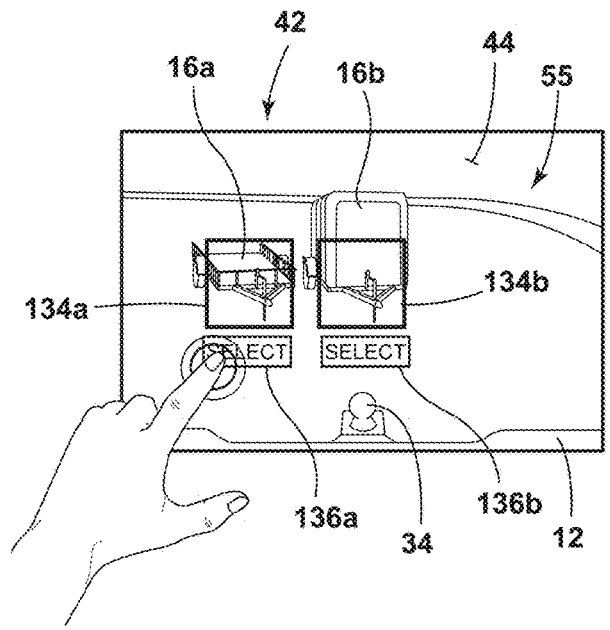
FIGS. 15A and 15B are images depicting a scheme for selecting one of a plurality of trailers in image data for alignment instructions according to any of the schemes.
Figure 15B:
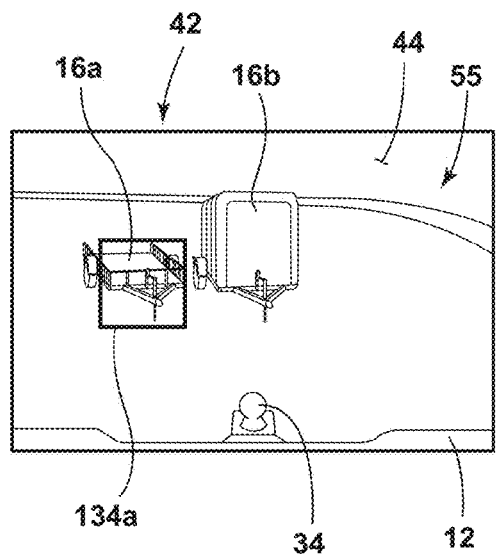
Figure 16A:
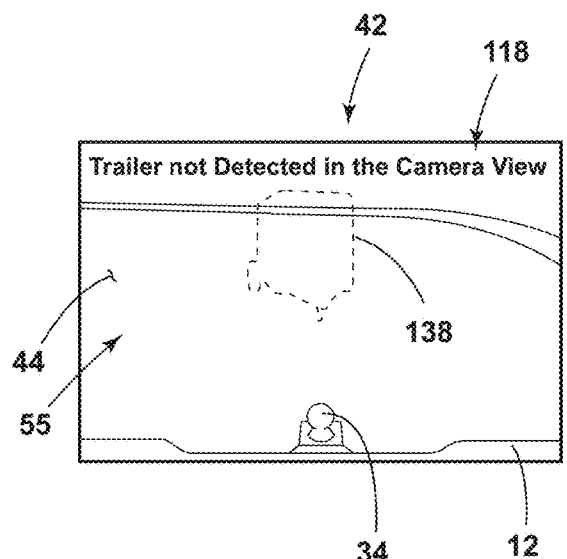
FIGS. 16A and 16B are images depicting an indication that no trailer is present in the available image data.
Figure 16B:
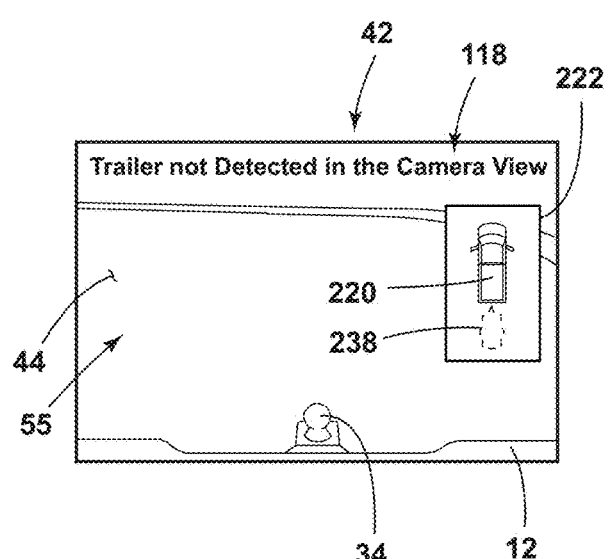

As shown in FIGS. 15A and 15B, the system 10 described herein, implementing the various coaching schemes described above with respect to FIGS. 9A-14B, can be configured to operate as desired when multiple trailers 16a,16b are initially present within the image data 55. In particular, when image processing routine 64 detects multiple trailers 16a,16b, system 10 can present indication boxes 134a,134b over the trailers 16a,16b respectively (with additional boxes being use for additionally-identified trailers). An instruction 136a,136b can be presented on screen 44 in connection with each such box 134a,134b to allow the user to "select" the desired trailer 16a,16b for hitching. when such an indication is made, such as by the user tapping on the touchscreen 42 in the area of the appropriate box 134a,134b or instruction 136a,136b, system 10 can proceed with any necessary coaching to achieve proper positioning of coupler 14 with respect to target area 110 and or an automated hitching maneuver to align the hitch ball 34 with the coupler 14. Similarly, as shown in FIGS. 16A and 16B, a phantom trailer indication 138 can be presented on screen 44 according to any of the coaching schemes described herein to indicate that no trailer has been detected. This can notify the user that vehicle 12 must be moved so that the desires trailer 16 is within view 49 of the camera 48, for example.

Figure 17:
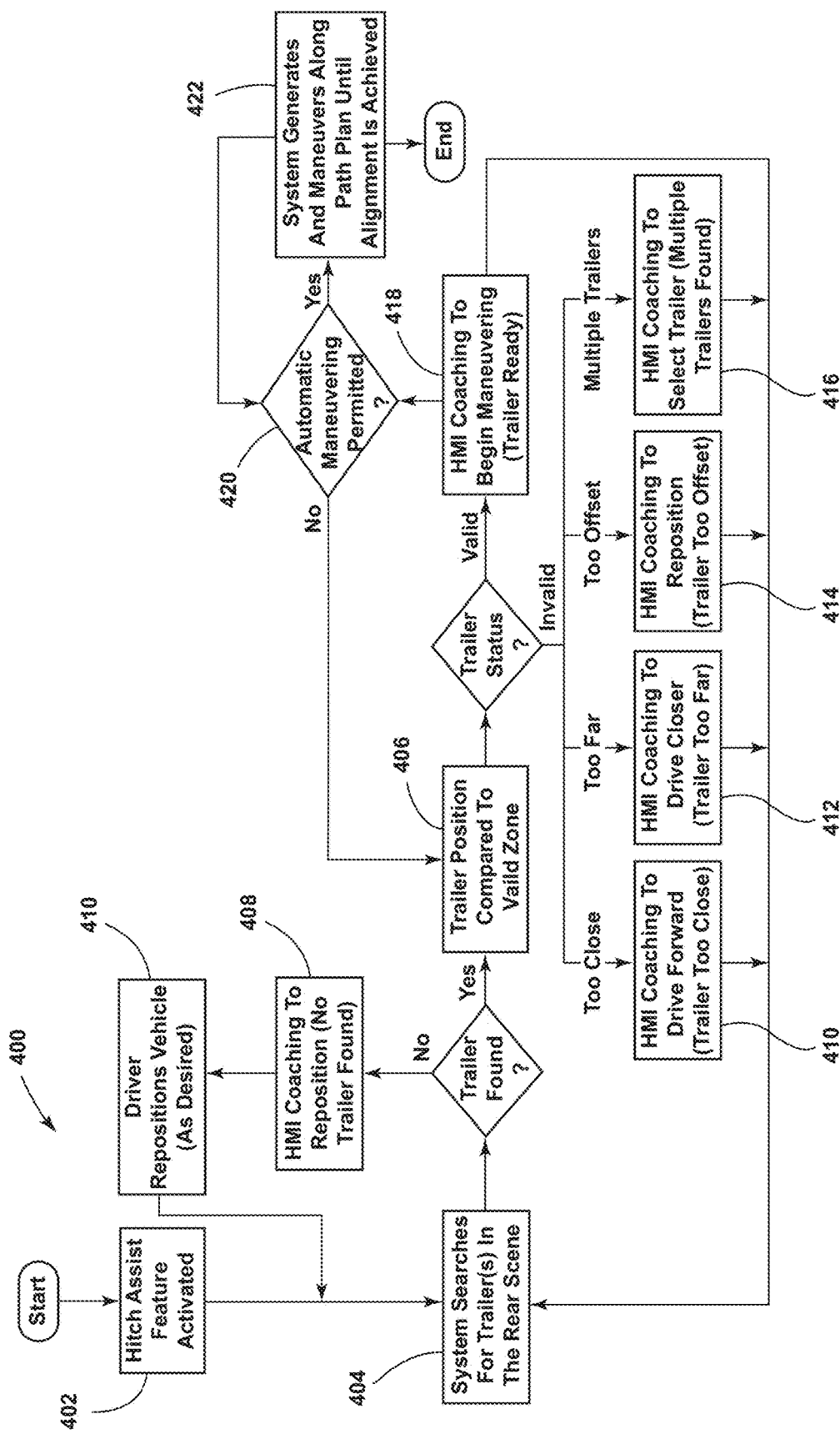
FIG. 17 is a flowchart depicting a method for aligning a vehicle for automated hitching with a trailer according to an aspect of the disclosure.

Turning now to FIG. 17, a flowchart showing steps in one operating scheme 400 for using hitch assist system 10 to align a vehicle hitch ball 34 with a trailer coupler 14 is shown. In particular, in step 402, the hitch assist system 10 is initiated. Once the hitch assist system 10 is initiated 402, controller 26 can use imaging system 18 to scan the viewable scene using any or all available cameras 48, 50, 52a, 52b (step 404). The scene scan (step 404) can be used to then identify 406 the trailer 16 and coupler 14. If the trailer 16 and/or coupler 14 can be identified (step 404), it can then be determined 406 if the coupler 14 is within the target area 110. In one aspect, if no trailer 16 can be identified, system 10 can instruct the driver to reposition the vehicle or otherwise notify the driver that no trailer 16 can be found, including by presenting one of the phantom trailer images 138,238 shown in FIGS. 16A and 16B (step 408). The driver can then reposition the vehicle (step 410) with the scene scan (step 404) continuing to operate until a trailer 16 is identified. In step 406, if a trailer 16 is identified but the coupler 14 is not in the applicable target area 110, system 10 can instruct the user to reposition vehicle 12 accordingly, as discussed above. In particular, various instructions can be given (steps 410-416) that correspond to the particular position of coupler relative to the target area 110, as discussed above, including in various simultaneous combinations thereof. When the appropriate trailer 16 has been identified and valid positioning has been achieved, an additional instruction can be given (step 418) for the driver to relinquish control of vehicle 12 so that the automated hitching maneuver can be completed. When confirmation of the driver relinquishing control is received, system 10 can run operating routine 68 to automatically maneuver vehicle 12 toward trailer 16 to align the hitch ball 34 with the coupler 14, as long as no other condition arises such that automated maneuvering is not permitted (step 420). Operating routine 68 can continue to run until the desired alignment is achieved (step 422). It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   an imager outputting image data of a field of view rearward of the vehicle; and
   a controller:
   receiving a system initiation command and scanning the image data using an image processing routine to identify at least one of the trailer or a coupler of the trailer within the image data;
   determining that the at least one of the trailer or the coupler is outside of a specified area relative to the vehicle using the image processing routine and outputting an instruction for user-controlled movement of the vehicle determined to position the vehicle such that the at least one of the trailer or the coupler is within the specified area; and
   determining that the at least one of the trailer or the coupler is within the specified area using the image processing routine and outputting a steering signal to the vehicle to cause the vehicle to steer to align a hitch ball of the vehicle with the coupler.

2. The system of claim 1, wherein the specified area is defined between a maximum distance and a minimum distance from a rear of the vehicle and within left and right lateral vehicle control limits.

3. The system of claim 1, wherein the instruction for user-controlled movement of the vehicle includes a vehicle driving direction.

4. The system of claim 1, wherein the instruction for movement of the vehicle includes a vehicle steering direction.

5. The system of claim 1, wherein:
   the controller further outputs the image data and the instruction for user-controlled movement of the vehicle to a human-machine interface within the vehicle; and
   the human machine interface displays the image data and the instruction for user-controlled movement of the vehicle.

6. The system of claim 5, wherein the instruction for user-controlled movement of the vehicle includes a driving direction indicating element and a steering direction indicating element.

7. The system of claim 5, wherein the image data further includes a schematic representation of a position of the trailer and the coupler relative to the specified area.

8. The system of claim 5, wherein the controller further determines that no trailer or coupler can be identified in the image data and outputs the image data further including an indication that no trailer is identified rearward of the vehicle.

9. The system of claim 1, wherein the controller further:
   scans the image data using the image processing routine to identify at least one of a plurality of trailers or a plurality of couplers within the image data and prompts a driver for a selection of one of the plurality of trailers or the plurality of couplers as one of a targeted trailer or a targeted coupler;
   determines that the at least one of the targeted trailer or the targeted coupler is outside of the specified area relative to the vehicle using the image processing routine and outputs an instruction for user-controlled movement of the vehicle determined to position the at least one of the targeted trailer or the targeted coupler within the specified area; and determines that the at least one of the coupler and the trailer is within the specified area using the image processing routine and outputs the steering signal to the vehicle to cause the vehicle to steer to align a hitch ball of the vehicle with the selected coupler.

10. A method for assisting in a hitching operation of a vehicle with a trailer, comprising:

receiving a system initiation command and scanning the image data using an image processing routine to identify at least one of the trailer or a coupler of the trailer within image data to a rear of the vehicle received from an imager;

determining that the at least one of the trailer or the coupler is outside of a specified area relative to the vehicle using the image processing routine and outputting an instruction for user-controlled movement of the vehicle determined to position the vehicle such that the at least one of the trailer or the coupler is within the specified area; and determining that the at least one of the trailer or the coupler is within the specified area using the image processing routine and outputting a steering signal to the vehicle to cause the vehicle to steer to align a hitch ball of the vehicle with the coupler.

11. The method of claim 10, further including outputting a video image displayable on a human-machine interface within the vehicle, the video image including:

an image to the rear of the vehicle derived from the image data; and a graphic overlay of the instruction for user-controlled movement of the vehicle.

12. The method of claim 11, wherein the graphic overlay of the instruction for user-controlled movement of the vehicle includes a driving direction indicating element and a steering direction indicating element.

13. The method of claim 11, wherein the video image further includes a schematic representation of a position of the trailer and the coupler relative to the specified area.

* * * * *